(12) United States Patent
    Kim et al.

(10) Patent No.: US 9,591,209 B2
(45) Date of Patent: *Mar. 7, 2017

(54) METHOD FOR PHOTOGRAPHING CONTROL AND ELECTRONIC DEVICE THEREOF

(71) Applicant: Samsung Electronics Co., Ltd., Gyeonggi-do (KR)

(72) Inventors: Soo-Hyung Kim, Gyeonggi-do (KR); Hun-Cheol Oh, Seoul (KR)

(73) Assignee: Samsung Electronics Co., Ltd., Yeontong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,510

(22) Filed: Mar. 17, 2016

(65) Prior Publication Data

US 2016/0198086 A1 Jul. 7, 2016

Related U.S. Application Data

(63) Continuation of application No. 14/307,890, filed on Jun. 18, 2014, now Pat. No. 9,313,402.

(30) Foreign Application Priority Data

Jun. 20, 2013 (KR) ........................ 10-2013-0070778

(51) Int. Cl.
    *H04N 5/232* (2006.01)
(52) U.S. Cl.
    CPC ..... *H04N 5/23216* (2013.01); *H04N 5/23203* (2013.01); *H04N 5/23219* (2013.01); *H04N 5/23245* (2013.01); *H04N 5/23293* (2013.01)

(58) Field of Classification Search
    CPC .............. H04N 5/232; H04N 5/23245; H04N 5/23203; H04N 5/2228; H04N 5/23216; H04N 5/23219; H04N 1/00458; H04N 1/00461
    See application file for complete search history.

(56) References Cited

U.S. PATENT DOCUMENTS

| 7,539,409 | B2 | 5/2009 | Matsushita et al. |
| 8,149,277 | B2 | 4/2012 | Mitsuhashi |
| 8,520,116 | B2 | 8/2013 | Kang |
| 8,687,081 | B2 | 4/2014 | Kwon |
| 2006/0125928 | A1 | 6/2006 | Wolcott et al. |
| 2007/0103543 | A1* | 5/2007 | Anderson ............ H04N 5/2251 348/36 |
| 2011/0194010 | A1* | 8/2011 | Nakase ............. G06F 17/30256 348/333.11 |
| 2012/0274796 | A1* | 11/2012 | Choi ...................... H04N 5/232 348/220.1 |

FOREIGN PATENT DOCUMENTS

| KR | 10-2006-0037788 A | 5/2006 |
| KR | 10-2006-0072686 A | 6/2006 |
| KR | 10-2009-0022054 A | 3/2009 |
| KR | 10-2010-0088248 A | 8/2010 |

* cited by examiner

*Primary Examiner* — Tuan Ho
(74) *Attorney, Agent, or Firm* — Cha & Reiter, LLC

(57) ABSTRACT

Disclosed herein are a method and apparatus for photographing an object. One or more shooting modes are selected and a photograph is taken in accordance with the one or more selected shooting modes.

20 Claims, 14 Drawing Sheets

METHOD FOR PHOTOGRAPHING CONTROL AND ELECTRONIC DEVICE THEREOF

CROSS REFERENCE TO RELATED APPLICATIONS

This is a Continuation application of U.S. patent application Ser. No. 14/307,890 filed on Jun. 18, 2014 which claims the benefit under 35 U.S.C. §119(a) of a Korean patent application filed in the Korean Intellectual Property Office on Jun. 20, 2013 and assigned Serial No. 10-2013-0070778, the entire disclosure of which is hereby incorporated by reference.

BACKGROUND

1. Technical Field

The present disclosure relates to a method for photographing an object and an electronic device thereof.

2. Description of the Related Art

Due to the development of mobile communications, electronic devices are now considered essential for individual users. In addition to voice communication, electronic devices can further be used as multimedia devices that provide various additional functions, such as a camera function, a data communication function, a video playback function, an audio playback function, a messenger function, a scheduling function, an alarm function, etc.

In that regard, the development of cameras in electronic devices allows these devices to provide various photo shooting and scene modes. In this instance, the electronic device may provide a photographing function in which one of the various shooting and scene modes is automatically selected or controlled. Alternatively, the shooting and scene modes can be selected by using an external element.

Conventionally, when using the camera of an electronic device, in order to select the shooting and scene mode, several operations for changing the shooting and scene mode are required by configuring an environment. Such operations may be inconvenient when a quick snapshot is desired and the shooting and scene mode needs to be changed. That is, manipulating these operations may be inconvenient and time consuming such that the opportunity to take a desired snapshot may be lost. In addition, although some electronic devices provide various solutions by, for example, preparing the external element capable of selecting the shooting and scene mode, such solutions may be restricting and limiting.

SUMMARY

An aspect of the present disclosure solves at least the above-mentioned problems and/or disadvantages and provide at least the advantages described below. Accordingly, aspects of the present disclosure provide a method and apparatus for reducing the inconvenience of performing several operations when selecting a shooting and scene mode in a camera. Another aspect of the present disclosure provides a method and apparatus for photographing a desired snapshot quickly by decreasing a time required to select a shooting and scene mode.

A further aspect of the disclosure provides a method and apparatus for displaying a shooting and scene mode on the basis of a simple operation by using a touch screen. Yet another aspect of the present disclosure provides a method and apparatus for simplifying the display of a shooting and scene mode menu using a camera device or a motion detection sensor.

In accordance with an aspect of the present disclosure, a method of operating a camera of an electronic device is provided. The method may include displaying a screen for selecting one or more shooting modes in accordance with a photographing instruction in a preview screen; selecting the one or more shooting modes among a plurality of shooting modes displayed in the screen; and photographing in accordance with the selected one or more shooting mode.

In accordance with another aspect of the present disclosure, a method of operating an electronic device is provided. The method may include displaying a screen from which a shooting mode selection is detected on a preview screen of the electronic device; detecting one or more shooting modes selected from among a plurality of shooting modes displayed in the screen; and instructing a camera unit or a second electronic device including the camera unit to photograph in accordance with the selected one or more shooting modes.

In accordance with another aspect of the present disclosure, an electronic device is provided. The electronic device may include a display; and a processor operatively coupled to the display, the processor to: display a screen configured to select one or more shooting modes according to a photographing instruction; select the one or more shooting modes among a plurality of shooting modes displayed in the screen; and photograph in accordance with the selected one or more shooting modes.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Examples of the present disclosure will be described below with reference to the accompanying drawings. In the following description, well-known functions or constructions are not described in detail since they would obscure the present disclosure in unnecessary detail. Also, the terms used herein are defined in accordance with the functions of the present disclosure. Thus, the terms may vary depending on a user's or operator's intention and usage. That is, the terms used herein must be understood based on the descriptions made in the present disclosure.

In the description of various examples of the present disclosure, an electronic device may be described by assuming a touch screen capable of performing an input operation based on an input unit and a display operation based on a display unit in one physical screen. Although the display unit and the input unit are separately illustrated in the structure of the device, it is also possible that the display unit includes the input unit or that the input unit is represented by the display unit.

The present disclosure is not limited only to the electronic device including the touch screen. Rather, the present disclosure may also apply to a case where the display unit and the input unit are physically separate or may apply to various electronic devices including only one of the display unit and the input unit. Hereinafter, in various examples, the device having the touch screen may be an electronic device including a display unit, wherein the display unit is a touch screen including a touch input unit and a display unit, a display unit not including a touch input unit, a display unit including an input unit, etc.

Figure 1:
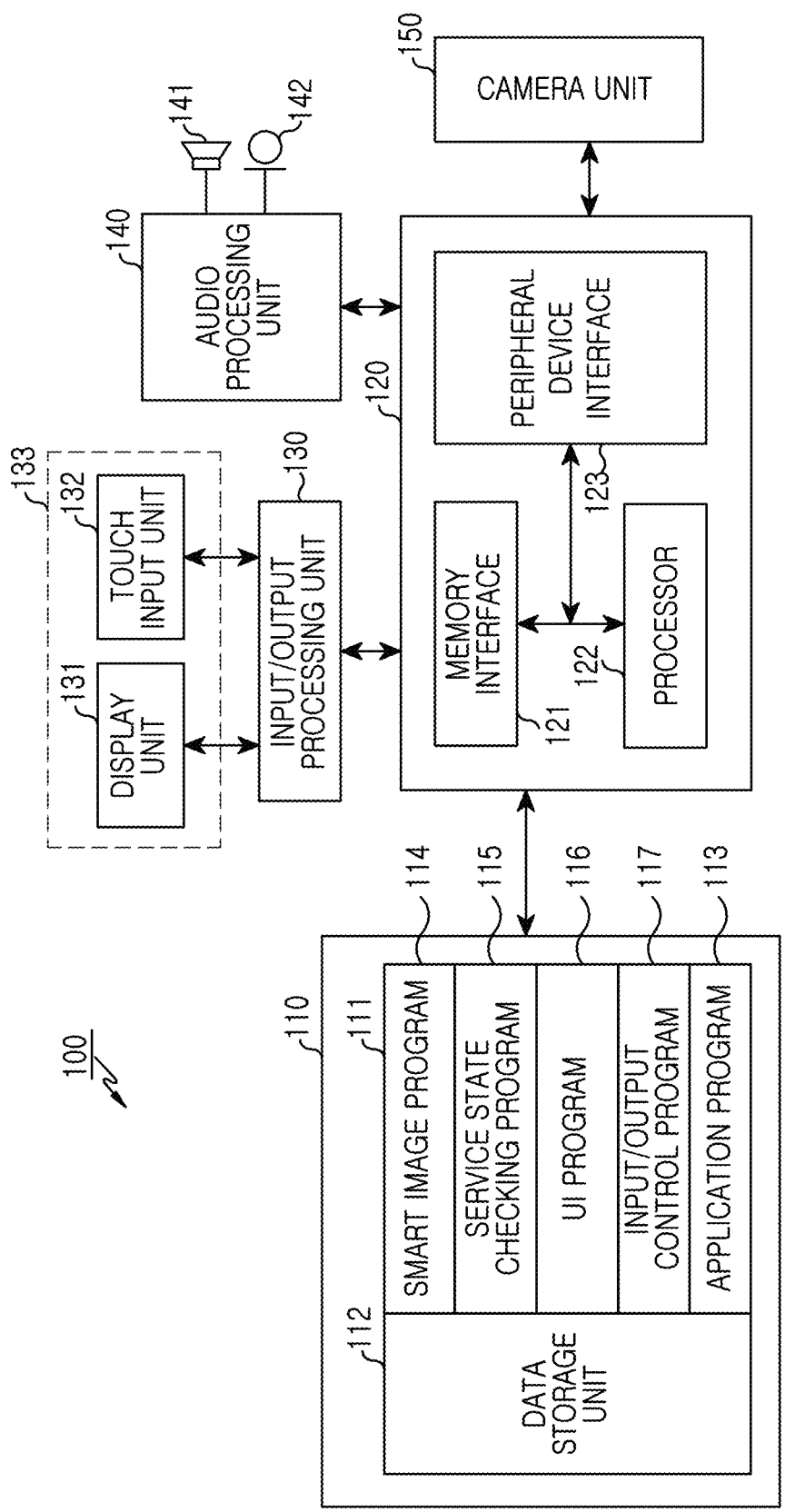
FIG. 1 is a block diagram of an example electronic device in accordance with aspects of the present disclosure.

FIG. 1 is a block diagram of an example electronic device in accordance with aspects of the present disclosure. Referring to FIG. 1, an electronic device 100 may include a mobile communication terminal, a Personal Digital Assistant (PDA), a Personal Computer (PC), a laptop, a smart phone, a smart Television (TV), a netbook, a Mobile Internet Device (MID), a Ultra Mobile Personal Computer (UMPC), a tablet PC, a mobile pad, a media player, a handheld computer, a navigation, a Motion Picture Experts Group Layer 3 Player (MP3P), etc.

When a component is mentioned as being "connected" to or "accessing" another component, this may mean that it is directly connected to or that it is directly accessing the other component, but it is to be understood that there may be intervening components present. On the other hand, when a component is mentioned as being "directly connected" to or "directly accessing" another component, it is to be understood that there are no intervening components present.

Electronic device 100 may include a memory 110 and a processor unit 120. A peripheral device may include an input/output processing unit 130, a display unit 131, a touch input unit 132, an audio processing unit 140, a communication system (not shown), and other peripheral devices. The memory 110 includes a program storage unit 111 for storing a program for controlling an operation of the electronic device 100 and a data storage unit 112 for storing data generated during the program is executed. Data generated by the program can be stored by the operation of a processor 122.

For example, the data storage unit 112 may sense an external control when a camera program is running, may display a menu for setting a shooting and scene mode, may store information that can be used for photographing in the selected shooting and scene mode, and may store data such as information for configuring a User Interface (UI) operation in an operation of displaying to the display unit 131.

The program storage unit 111 may include one or more application programs 113, a UI program 116, a communication control program (not shown), and an input/output control program 117. Programs included in the program storage unit 111 may include a group of instructions and thus may be expressed in an instruction set.

A smart image program 114 may control a camera unit 150 of the electronic device 100 or a camera program (not shown) for controlling the camera unit in accordance with program information. For example, when using camera unit 150, when an input predefined in the smart image program 114 is performed, the menu for setting the shooting and scene mode may be displayed on a second display unit (not shown) or the display unit 131 of a touch screen 133. In one example, if a problem occurs during display of the menu for setting the shooting and scene mode, displaying of the menu may be reconfigured in accordance with information determined in the smart image program 114.

A service state checking program 115 may include one or more software components for checking a state of a service provided by programs or constitutional elements of the electronic device 100. For example, the service state checking program 115 may confirm that a predefined input is performed in the electronic device 100, may display a menu for setting the shooting and scene mode using smart image program 114, or may recognize a service state indicating, for example, whether an error occurs in the display unit 131 of the touch screen 133 or the second display unit (not shown).

In another example, the service state checking program 115 may sense an operation of setting the displayed shooting and scene mode; and, in an operation of photographing an object in accordance with information of the selected shooting and scene mode, may recognize a service state so that the camera unit 150 performs an instruction under the control of the smart image program 114 or the camera program (not shown). The UI program 116 may include one or more instructions and software components for providing a UI in the electronic device 100.

For example, in an operation of using an object photographing program, the UI program 116 may be used to control an operation of performing a photograph preparation upon sensing a touch-hold action or an operation of configuring a menu capable of selecting the shooting and scene mode by using a Graphic User Interface (GUI) operation and displaying the menu to the display unit 131.

The input/output control program 117 may display the operation of the electronic device 100 to the display unit 131, and may input an operation instruction of the electronic device 100 via the touch input unit 132.

Although not shown, a communication control program (not shown) may include one or more software components for controlling communication with one or more second electronic devices by the use of a communication system (not shown). For example, the communication control program (not shown) may search for the second electronic device. If the second electronic device is found, the communication control program (not shown) may establish a communication link with the second electronic device. Thereafter, the communication control program (not shown) may transmit and receive data such as alarm information or the like with respect to the second electronic device via the communication system (not shown) by performing a capability search and session establishment procedure with respect to the connected second electronic device.

The application program 113 may include a software component for one or more application programs installed in the memory 110 of the electronic device 100. The memory 110 included in the electronic device 100 may consist of one or more units. In addition, in accordance with a usage, the memory 110 may function only as the program storage unit 111, may function only as the data storage unit 112, or may function as both. In accordance with a device feature, a physical area inside the memory 110 may not be clearly divided.

The processor unit 120 may include a memory interface 121, at least one processor 122, and a peripheral device interface 123. Herein, the memory interface 121, at least one processor, 122, and peripheral device interface 123 included in the processor unit 120 may be integrated in at least one circuit or may be implemented as separate components. The memory interface 121 may control an access to the memory 110 of a component such as the processor 122 or the peripheral device interface 123. The peripheral device interface 123 may control a connection of the processor 122 and the memory interface 121 with respect to an input/output peripheral device of the electronic device 100. The processor 122 may control the electronic device 100 to provide various multimedia services by using at least one software program, may control the display unit 131 to perform a display operation to confirm a UI operation of the electronic device via the input/output processing unit 130, and may control the touch input unit 132 to provide a service for receiving an instruction input from an external element of the electronic device 100. The processor 122 may execute at least one program stored in the memory 110 to provide a service corresponding to the program.

The audio processing unit 140 may provide an audio interface between a user and the electronic device 100 via a speaker 141 and a microphone 142. A communication system (not shown) may perform a communication function. For example, the communication system (not shown) may perform communication with the second electronic device by using one or more of near field wireless communication (e.g., mobile communication via a base station, etc., infrared wireless communication, Bluetooth communication, Bluetooth Low Energy (BLE) communication, wireless Local Area Network (LAN) communication, etc.) and wired communication.

The input/output processing unit 130 may provide an interface between the peripheral device interface 123 and the input/output unit such as the display unit 131 and the touch input unit 132. The touch input unit 132 may provide input data generated by a user's selection to the processor unit 120 via the input/output processing unit 130. For example, the touch input unit 132 may include a control button to receive data for the control from the external element of the electronic device 100, or may consist of a keypad.

In another example, the touch input unit 132 may be included in the display unit 131 together with the touch screen 133. In this case, the touch input unit 132 used in the touch screen may use one or more of a capacitive type, a resistance (pressure sensitive) type, an infrared type, an electro inductive type, an ultrasonic type, an image sensing type, a hovering type, a motion sensing type, etc.

The display unit 131 may execute a UI operation by receiving state information of the electronic device 100 and may display it under the control or the input/output processing unit 130. For example, when the photographing program is used and a shooting and scene mode is selected, the electronic device 100 may provide control to configure the UI operation and display it to the display unit 131 so that the selectable shooting and scene mode can be confirmed.

The touch screen 133 may comprise the touch input unit 132 on the display unit 13, and may input an instruction by touching a screen configuration displayed on the display unit 131 in the operation of the electronic device 100. For example, the touch screen 133 may act as the display unit 131 for displaying the UI operation of the electronic device 100 and act as the touch input unit 132 for inputting an external instruction to the electronic device 100. Therefore, in the following description, the display unit 131 of the touch screen 133 and the touch input unit 132 of the touch screen 133 may be represented by the touch screen 133.

The camera unit 150 may include an optical unit, a motion detection sensor (or a motion sensor), an image sensor (not shown), etc., and may be constructed with a module such as a motion detection module, a camera module, etc. The optical unit may be driven by a mecha-shutter, a motor, or an actuator, and may perform an operation such as a zoom function, a focusing function, etc., by the use of the actuator. The optical unit may photograph an object located nearby. The image sensor may sense an image photographed by the optical unit and convert it into an electrical signal. Herein, the image sensor (not shown) may be a sensor such as a Complementary Metal Oxides Semiconductor (CMOS) or a Charge Coupled Device (CCD), and another high-definition image sensor may also be used. The image sensor of the camera may have a global shutter embedded therein. The global shutter may perform a similar function as the mecha-shutter embedded in the sensor.

The motion detection unit (not shown) or a depth detection unit may recognize a 3 Dimensional (3D) motion of an object in a (3D) space on which the object is located. In accordance with a device characteristic of recognizing a motion of the object, a mechanical type, a magnetic type, an optical type, an infrared type, etc., may be used. The motion detection unit may be included in the camera unit 150, or may be configured with a module.

Figure 2:
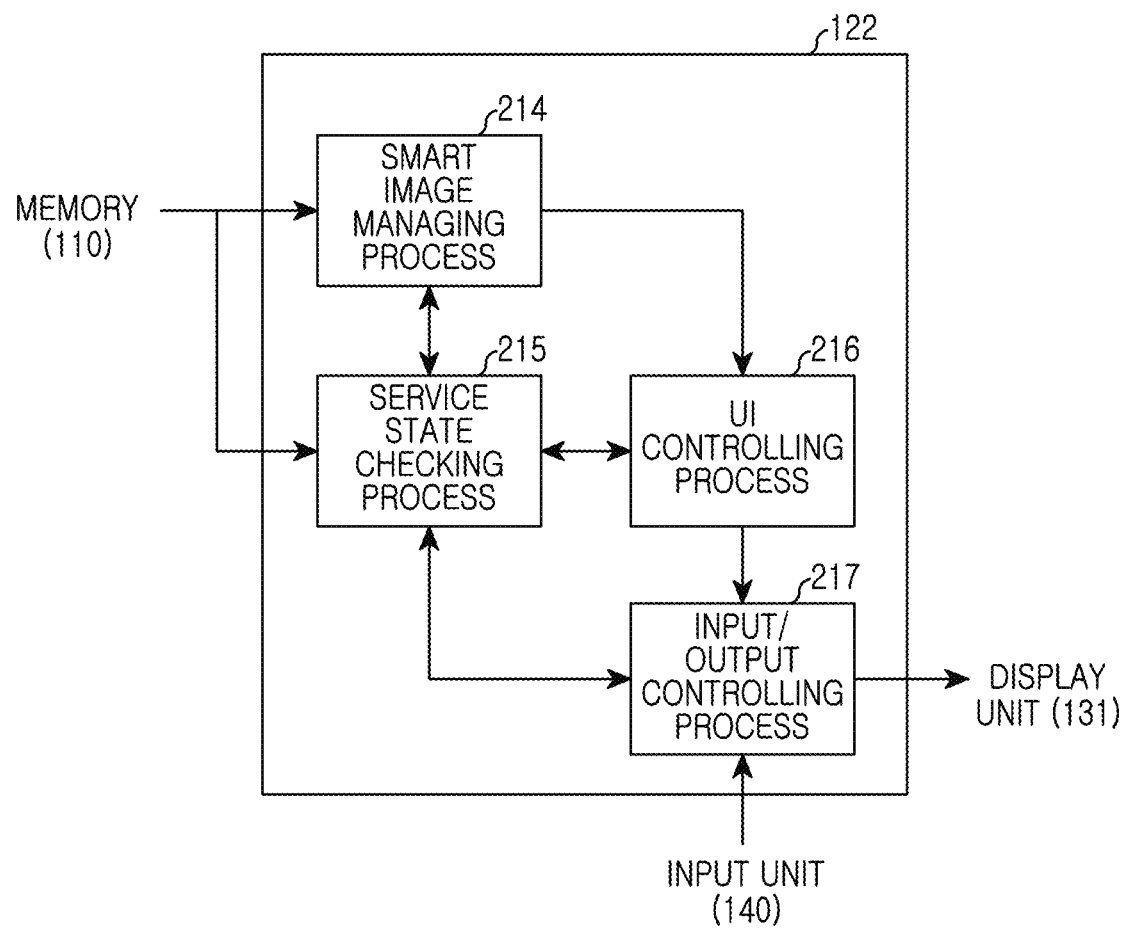
FIG. 2 illustrates an example structure for processing an operation of a processor in an electronic device in accordance with aspects of the present disclosure.

FIG. 2 illustrates an example structure for processing an example operation of a processor in an electronic device. Referring to FIG. 2, the processor 122 may include a smart image managing process 214, a service state checking process 215, a UI controlling process 216, and an input/output controlling process 217.

The smart image managing process 214 may control a camera (not shown) installed in the electronic device 100 by using the smart image program 114. For example, in a photographing standby state of an object photographing program, the smart image managing process 214 may detect a predefined input for setting a shooting and scene mode from the service state checking process 215, and may control the UI controlling process 216 to display information on the menu for setting the shooting and scene mode. In another example, the smart image managing process 214 may confirm that one of the shooting and scene modes displayed on the display unit 131 is selected from the service state checking process 215, and may provide control to photograph an object in accordance with the selected mode.

The service state checking process 215 may execute the service state checking program 115 to check the relation of devices and programs included in the electronic device 100 and a state of the provided service. For example, the service state checking process 215 may check a predefined input for setting the shooting and scene mode from the input/output controlling process 217, and may check a state of a service for controlling the smart image managing process 214 to process information for setting the shooting and scene mode.

In another example, the service state checking process 215 may check a state of a service by which the smart image managing process 214 controls the UI controlling process 216 to configure a UI operation displayed on the display unit 131 by using information on the menu for setting the shooting and scene mode. In yet another example, the service state checking process 215 may check a service state, for example, for indicating whether a UI of the smart image program 114 is displayed erroneously in the display unit 131. In yet a further example, the service state checking process 215 may confirm that one of the shooting and scene modes is selected from the input/output controlling process 217, and may check a state of a service for controlling the smart image managing process 214 to photograph an object in accordance with the selected mode.

In the structure of FIG. 2, the smart image managing process 214, service state checking process 215, UI controlling process 216, and input/output controlling process 217 of the processor 122 are separately illustrated to facilitate the understanding of the operation of the processor 122. It is understood that processor 122 can be arranged in a variety of ways and that processor 122 shown in FIG. 2 is merely illustrative.

Figure 3A:
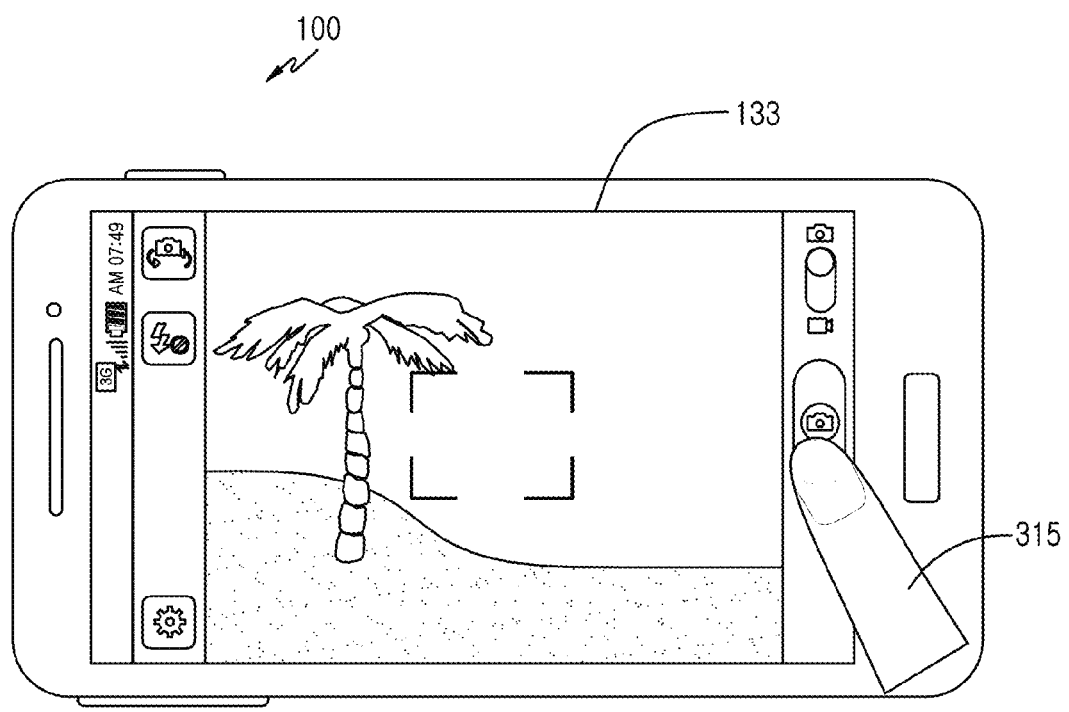
FIG. 3A, FIG. 3B, FIG. 3C, FIG. 3D, FIG. 3E, and FIG. 3F illustrate an example UI displayed on a touch screen in an electronic device in accordance with aspects of the present disclosure.

FIG. 3A illustrates an example UI displayed on a touch screen in an electronic device. In this example, a shooting and scene mode is set by using the touch screen 133 while a photographing program of the electronic device 100 is running. For example, when the photographing program is executed, a menu for setting the shooting and scene mode may be displayed to change the shooting and scene mode. To display the menu, the display of the menu may be controlled by performing the input predefined by the smart image program 114.

When a photographing icon displayed on the touch screen 133 is touched, a photograph preparation may be performed, a camera state may be controlled in accordance with an instruction programmed in a camera program (not shown), and an object may be photographed. The photograph preparation may include, for example, an operation of adjusting a focus before an object is photographed by the camera program, an operation of controlling an aperture, an operation of controlling a view angle, an operation of controlling a zoom (e.g., focal distance) function, an operation of standing by more than a specific time, a facial or biometric recognition operation, a brainwave recognition operation, a voice recognition operation, an operation of standing by a control input from a second electronic device, etc.

One example of photograph preparation is shown in FIG. 3A. In this example, a focusing operation is performed to adjust a focus of the camera unit 150, when the photographing icon is touched in a preview state.

In one example, the preview may comprise a preparatory photographing state in which an object viewed through the camera unit 150 is displayed on the touch screen 133 or a second display unit (not shown), but before a photographed image is generated. In one example of the predefined input, a touch and hold of the photographing icon for more than a predetermined time may be detected. When the touch is held long enough for a photograph preparation to perform, the smart image program 114 may perform the photograph preparation and may display a menu for setting a shooting and scene mode on the touch screen 133.

In another example of the predefined input, if it is determined that the photographing icon displayed on touch screen 133 is touched and dragged in a reference direction, the smart image program 114 may control the camera program (not shown) to perform the photograph preparation and to display the menu for setting the shooting and scene mode on the touch screen 133 before photographing.

In the predefined input examples, the photograph preparation may be performed at a different time (e.g., before the predefined input or after the operation of displaying the menu for setting the shooting and scene mode), and another operation other than photograph preparation may exist between the predefined input and the display of the menu for setting the shooting and scene mode. In addition, after the predefined input is performed, the photograph preparation and the displaying of the menu for setting the shooting and scene mode may be simultaneously performed.

If a short touch operation (e.g., a click) is performed without maintaining a touch of a photographing icon on touch screen 133, the camera program (not shown) may allow the existing shooting and scene mode to be maintained, may perform the photograph preparation, and may photograph in accordance with a typical photographing method.

In addition to FIG. 3A, a predefined input that may cause display of a menu for setting a shooting and scene mode. An input configured to select the shooting and scene mode, etc., may comprise a voice instruction (or voice input) method in which an instruction predetermined in the electronic device 100 is input with a voice through the microphone 142 or may use a plurality of methods described above in parallel. In addition to a method of using a motion input of an object by using the touch screen 133, an input unit (not shown), the camera unit 150, or a motion detection unit (not shown) may be used. Furthermore, a result of the input performed by the electronic device 100 may also be displayed by using a method of outputting a voice or pre-set signal via the speaker 141.

Figure 3B:
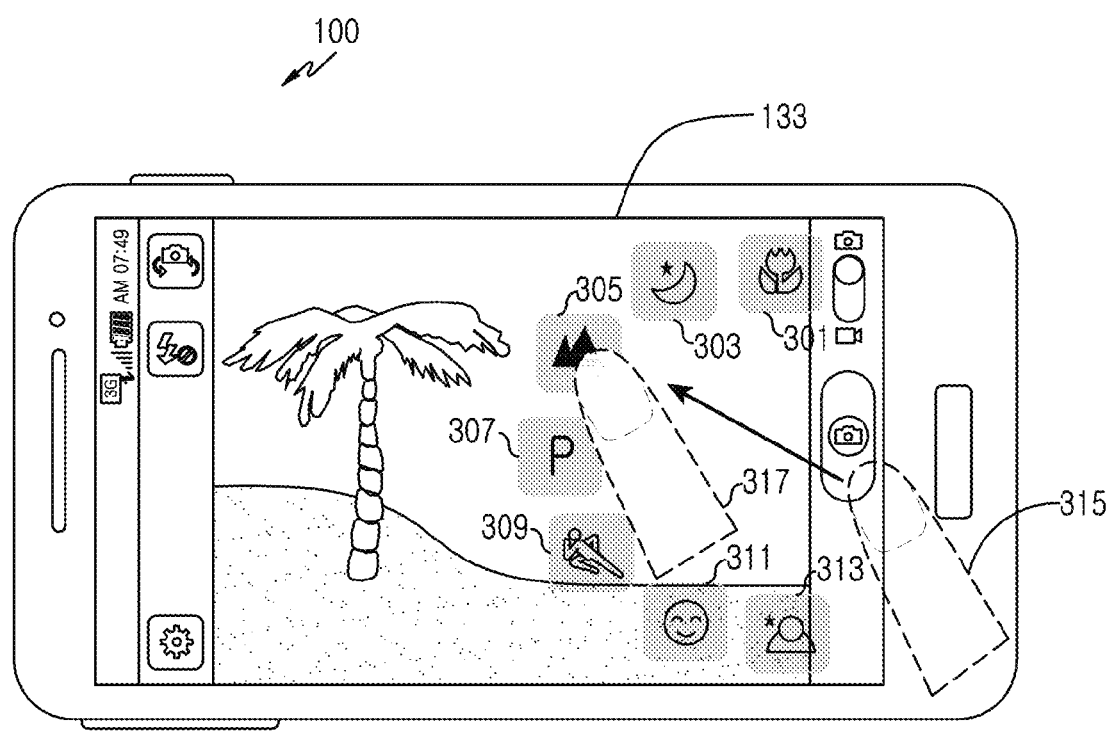

FIG. 3B illustrates an example UI displayed on a touch screen in an electronic device. Referring to FIG. 3B, when a photographing program is executed and an instruction for displaying the shooting and scene mode is input (e.g., a predefined input) in a photographing standby state, a menu for setting the shooting and scene mode may be displayed on a certain area of the touch screen 133 in accordance with the UI determined in the smart image program 114.

The shooting and scene mode may allow various functions to be selected via an icon or a list when an object is photographed. The various functions may be an object photographing style (e.g., a cartoon, a sketch, a panorama, sports, etc.), an object photographing target (e.g., a daytime scene, a daytime portrait, a nighttime landscape, a nighttime portrait, a smile, a close-up shot, a High Dynamic Range (HDR) shot, a 3D shot, etc.), or an object photographing technique (e.g., an exposure control, a focal control, a shutter speed control, an image sensitivity control, etc.).

In one example of the display, FIG. 3B illustrates a plurality of icons displayed in a semi-circular shape with a reference distance around a photographing icon. In this example, the icons are displayed in the semi-circular shape for illustrative purposes only, and thus various shapes such as semi-circular shape, a circular shape, a triangular shape, a rectangular shape, and a diamond shape may be applied in accordance with information programmed in the smart image program 114, or a specific shape may not be determined when displayed.

When the menu for setting the shooting and scene mode is displayed on the touch screen 133 by using an icon or the like in accordance with the shooting and scene mode display instruction, one or more of the displayed shooting and scene modes may be selected. In one example of the selection, FIG. 3B illustrates that a landscape mode can be selected in a photographing standby state of a camera service (not shown) such that a predefined input (e.g., one of the examples of FIG. 3A) is determined to an operation of touching a photographing icon of the touch screen 133 more than a predetermined time (see predefined input 315), and when a menu for setting a shooting and scene mode is displayed on the touch screen 133 on which the predefined input is performed and the photographing standby state is displayed, a touch is held and dragged and is then released when approaching an icon corresponding to a desired shooting and scene mode (e.g., a landscape mode for taking a picture of a landscape).

In another example of the selection, when the menu for setting the shooting and scene mode is displayed, a touch may be released and one of the shooting and scene mode icons displayed on the touch screen 133 and intended for photographing may be touched and selected. In yet another example of the selection, when the menu for setting the shooting and scene mode is displayed, by releasing a touch and by touching a photographing icon, the existing shooting and scene mode may be maintained without having to select one of the shooting and scene modes. In addition to the aforementioned examples, one or more of the displayed shooting and scene modes may be selected by using, for example, voice recognition, facial or biometric recognition, image recognition, hovering recognition, brainwave recognition, a control from a second electronic device, etc.

Figure 3C:
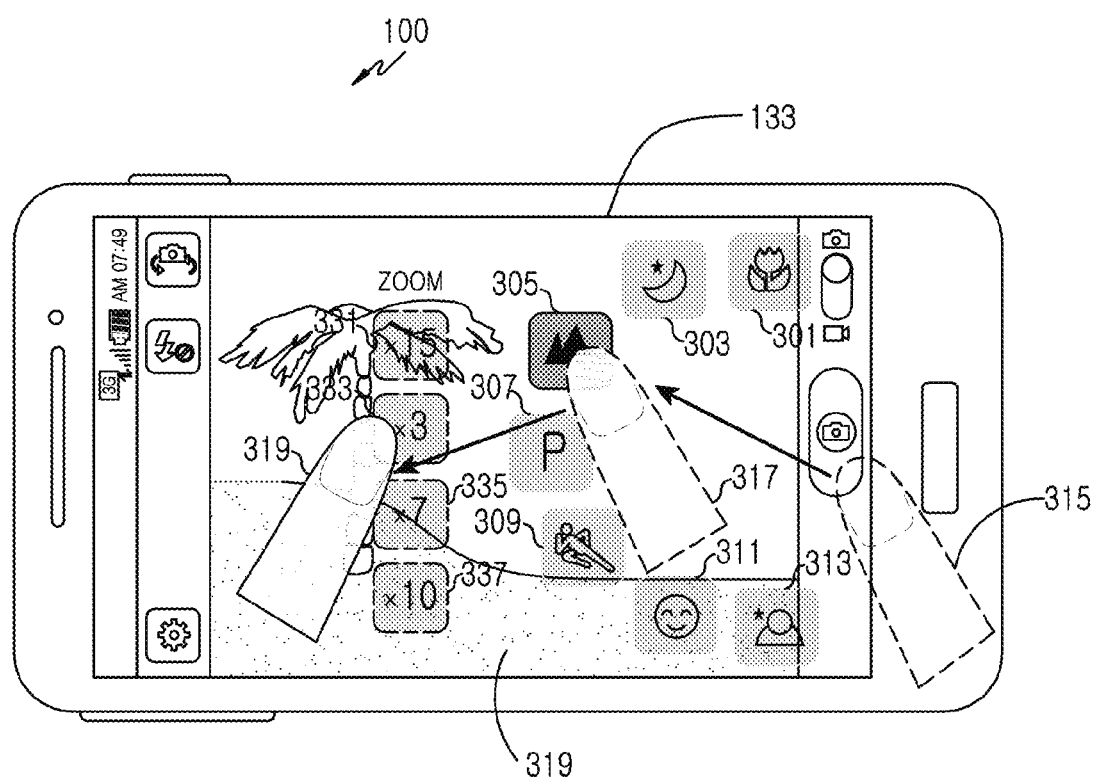

FIG. 3C illustrates an example UI displayed on a touch screen in an electronic device. In this example, an adjustable setting value of the selected shooting mode is displayed on the touch screen 133. Here, one mode is selected from a menu for setting a shooting and scene mode of the electronic device 100. The selected mode can change a setting value from variables which are adjustable while in the selected mode.

In one example of the display, one of menu icons for setting the shooting and scene mode (e.g., a landscape mode 305) is selected. The landscape mode 305 may include setting values capable of controlling a magnification of a zoom function by using the camera unit 150. The magnification is just one example of the various variables that may be controlled.

The electronic device 100 may configure a UI operation of setting values 331 to 337 for setting a magnification of a zoom function in accordance with information determined in the smart image program 114, and may display the configured UI operation on the touch screen 133. One or more methods may be used among various methods described in FIG. 3B for displaying on touch screen 133.

Referring now to FIG. 3C, the landscape mode 305 is selected by a predefined input 317 from the menu icons for setting a shooting and scene mode. When an object is photographed in the landscape mode 305, a list of magnifications (e.g., a setting value of ×1.5, ×3, ×7, ×10, etc.) that may be modified in a zoom function of the camera unit 150 may be displayed on the touch screen 133 (see 331, 333, 335, 337). Magnification is one of various settings or variables that may be adjusted by a user. Among adjustable setting value menu icons of the landscape mode 305 displayed on the touch screen 133, the ×3-mode 333 corresponding to an ×3-zoom may be selected.

Figure 3D:
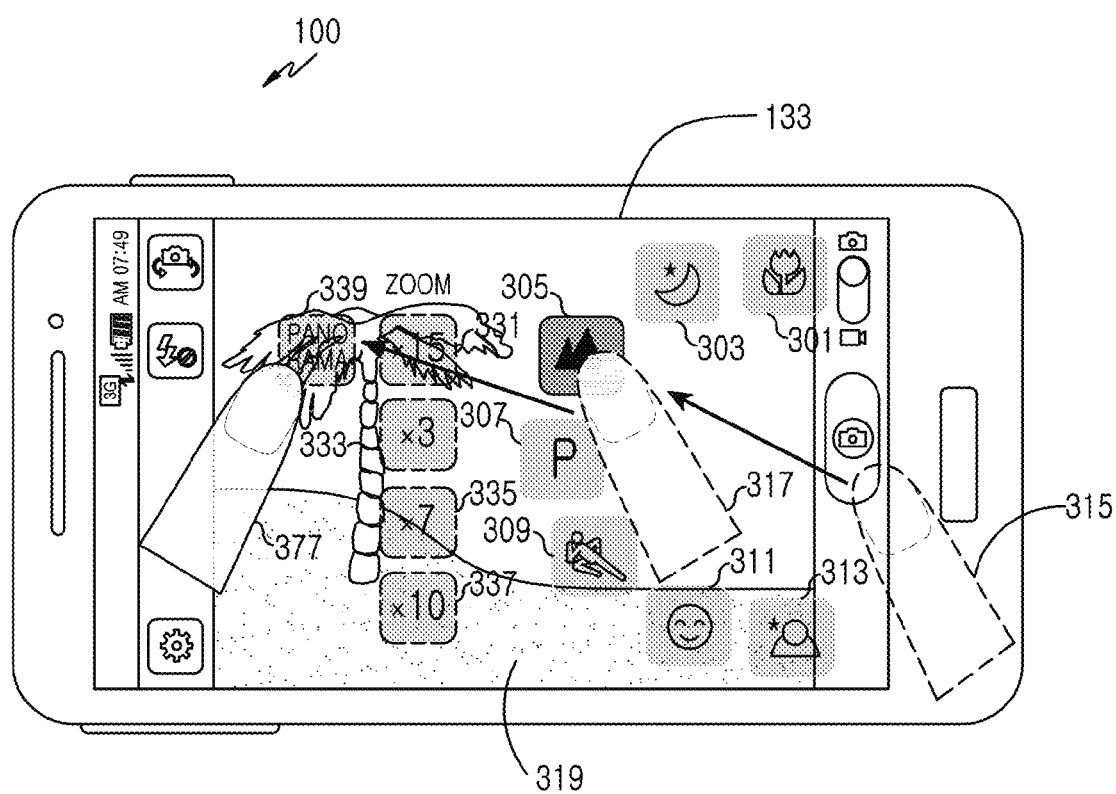

FIG. 3D illustrates another example UI displayed on a touch screen in an electronic device. Referring to FIG. 3D, one shooting and scene mode may be selected from a menu. If a setting value of a variable controlled by the selected mode can be adjusted, a setting value for one or more adjustable variables of the selected shooting mode may be displayed on touch screen 133.

In one example of the display, a menu icon for setting the shooting and scene may be selected. The landscape mode 305 may include a setting value capable of adjusting a magnification of a zoom function by using the camera unit 150 among various adjustable variables for determining a panorama photographing service.

The electronic device 100 may configure a UI operation for setting zoom magnification values 331 to 337 in accordance with information determined in the smart image program 114 and a setting value for determining whether to use a panorama function 339, and may display the configured UI operation on the touch screen 133.

In another example, in FIG. 3D, the landscape mode 305 may be selected and the panorama function 339 may be selected, by using the same method used for selecting the shooting mode or the setting value in FIG. 3C. In addition, two or more setting functions may be selected by using the method of FIG. 3C for confirming that the setting value ×3 333 capable of controlling the magnification of the zoom function is selected (e.g., a selected icon changes in color as shown in 305 of FIG. 3C) and for continuously selecting the panorama function 339.

Figure 3E:
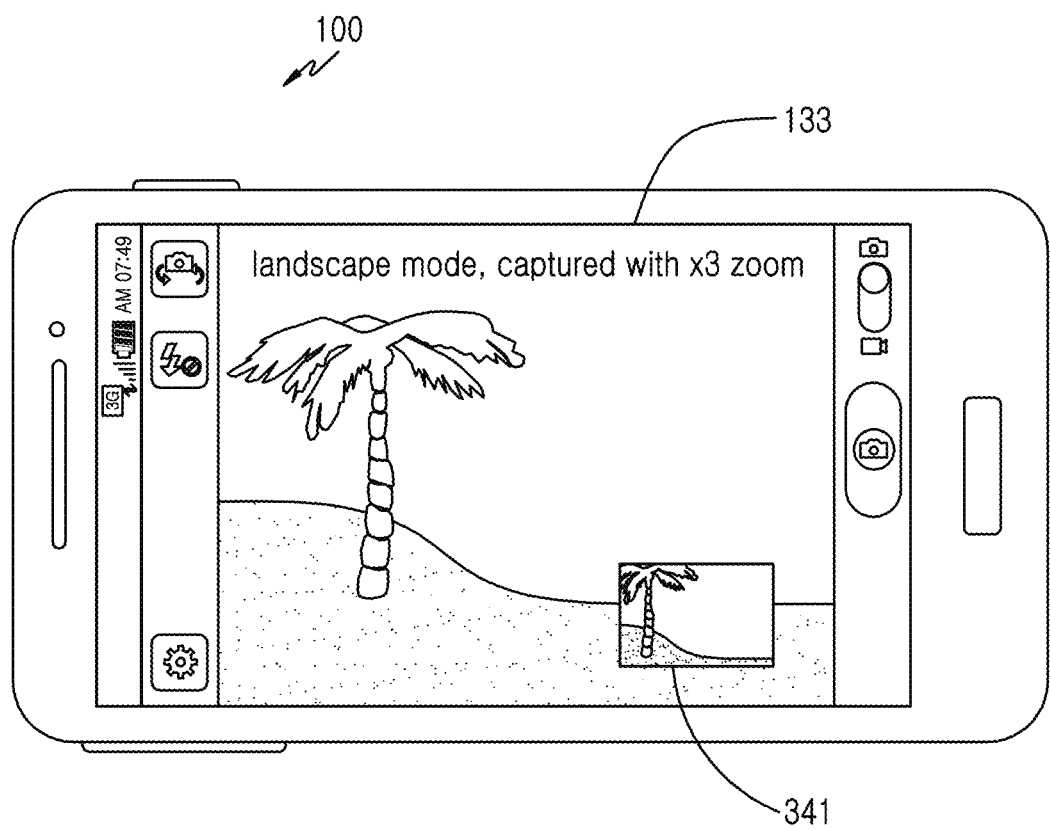

FIG. 3E illustrates another example UI displayed on a touch screen in an electronic device. Referring to FIG. 3E, the electronic device 100 may photograph an object by controlling the camera unit 150 in accordance with the smart image program 114 or information such as a selected shooting mode (e.g., a landscape mode 305, a 3× zoom mode 333, etc.), may store the photographed image data into the memory 110, and may display photographing information to a preview screen of the touch screen 133. In addition, it may be determined that a gallery (or album) program (not shown) capable of confirming image data captured by using the camera unit 150 is executed by displaying the photographed image (see image preview 341) to be confirmed and by touching an area displaying the preview image data (see image preview 341).

The photographing information may be displayed on the touch screen 133 as illustrated in the example of FIG. 3E, or may be displayed on a second display unit (not shown) or may be displayed by outputting a voice or pre-set signal via the speaker 141.

Furthermore, the photographing may be performed by controlling a state of the camera unit 150 automatically without an additional photographing operation, when a shooting mode or a setting value is determined, by determining the shooting mode or the setting value and performing the additional photographing operation. The photographing may be performed by controlling the state of the camera unit 150.

Figure 3F:
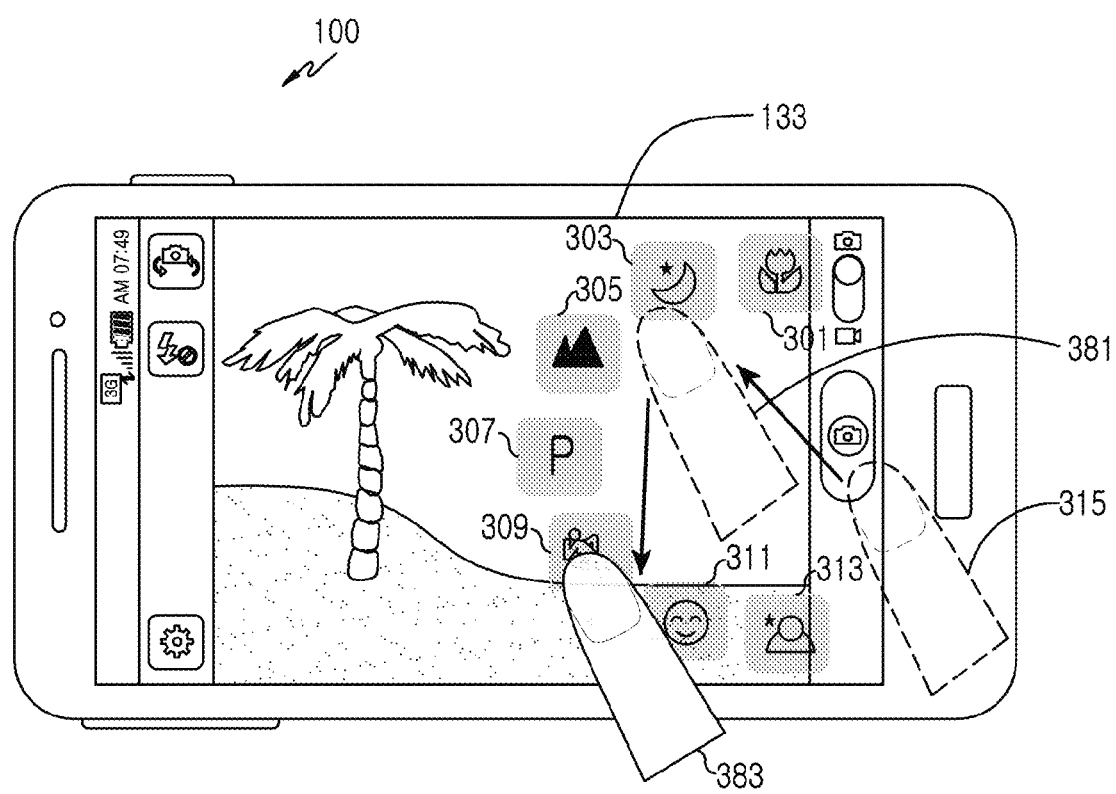

FIG. 3F illustrates yet another example UI displayed on a touch screen in an electronic device. In this example, one mode is selected from a menu for setting a shooting and scene mode of the electronic device 100 and another scene mode is further selected. For example, one of the menu icons for setting a shooting and scene mode (e.g., a nighttime scene mode 303) may be selected, and another scene mode (e.g., a sports mode 309) may be further selected. The nighttime scene mode 303 may include setting values capable of controlling a variable such as a magnification of a zoom function, an aperture value, etc., by using the camera unit 150. The sports mode 309 may include setting values capable of controlling a variable such as a magnification of a zoom function, an aperture, a shutter speed, etc., by using the camera unit 150. The electronic device 100 may control the camera unit 150 by using one or more values among setting values (e.g., a magnification of a zoom function, an aperture, etc.) that can be controlled by the selected nighttime scene mode 303 and sports mode 309, and may perform the photographing.

Although not shown, an adjustable setting value may be included among values that can be adjusted by the nighttime scene mode 303 or the sports mode 309. As indicated by 331 to 330 of FIG. 3D, a UI operation corresponding to adjustable setting values among variables that can be controlled by the nighttime scene mode 303 or the sports mode 309 may be displayed on the touch screen. If a plurality of shooting and scene modes are selected from the menu for setting the displayed shooting and scene modes, as illustrated in FIG. 3F, the electronic device 100 may select a plurality of shooting and scene modes by using, for example, a touch, drag, and release operation.

By way of example, the menu for setting the shooting and scene mode by using a touch operation may be displayed, and may be activated by selecting a first shooting and scene mode (e.g., a nighttime scene mode 303) through a drag. The electronic device 100 may select and activate a second shooting and scene mode (e.g., a sports mode 309) through a drag instead of releasing a touch from a screen, and if the touch is released, the photographing may be performed in accordance with the selected two shooting and scene modes.

In addition, if an adjustable setting value is provided by the selected two shooting and scene modes, the electronic device 100 may display the UI in accordance with the selected shooting and scene modes. The electronic device 100 may select a setting value to be changed, before performing an operation of a touch release or the like for ending the selection of the shooting and scene modes.

Figure 4A:
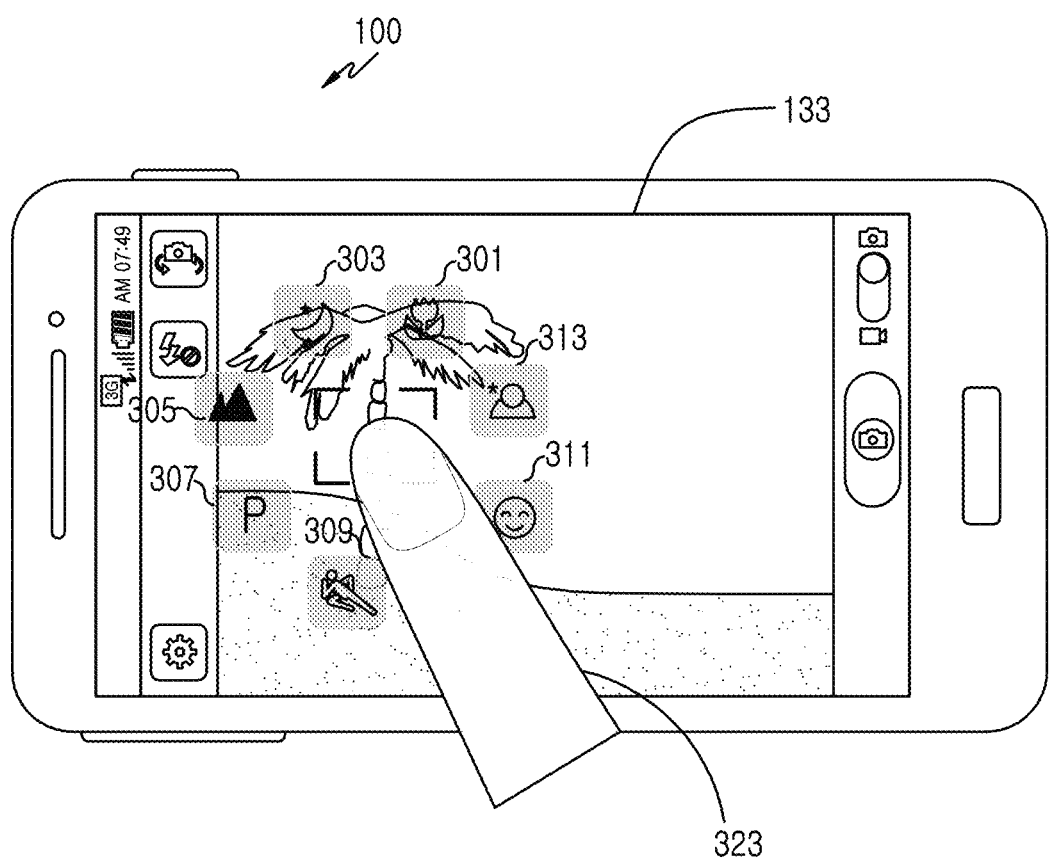
FIG. 4A and FIG. 4B illustrate an example UI displayed on a touch screen in an electronic device in accordance with aspects of the present disclosure.

FIG. 4A illustrates another example UI displayed on a touch screen in an electronic device. The electronic device 100 may display a preview on the touch screen 133 via the camera unit 150, and may display a menu for setting a shooting and scene mode on the touch screen 133 in accordance with information determined in the smart image program 114 in response to a predefined input.

Referring to FIG. 4A, a method different from the method of displaying the menu for setting the shooting and scene mode in FIG. 3B may be used. In the example of FIG. 4A, in addition to detecting a predefined input by detecting touching and maintaining of a photographing icon, an area desired to be the subject of a focus adjustment is touched and focused in the preview displayed on the touch screen 133 via the camera unit 150, and an operation of maintaining a touch state for more than a predetermined time may be deemed the predefined input for displaying the menu for setting the shooting and scene mode.

In response to the predefined input of a touch in a photograph preview, the electronic device 100 may control the camera unit 150 to focus. As one of various examples for the display method, a UI may be displayed on touch screen 133 showing the shooting and scene mode icons located around a touch of the touch screen 133.

Figure 4B:
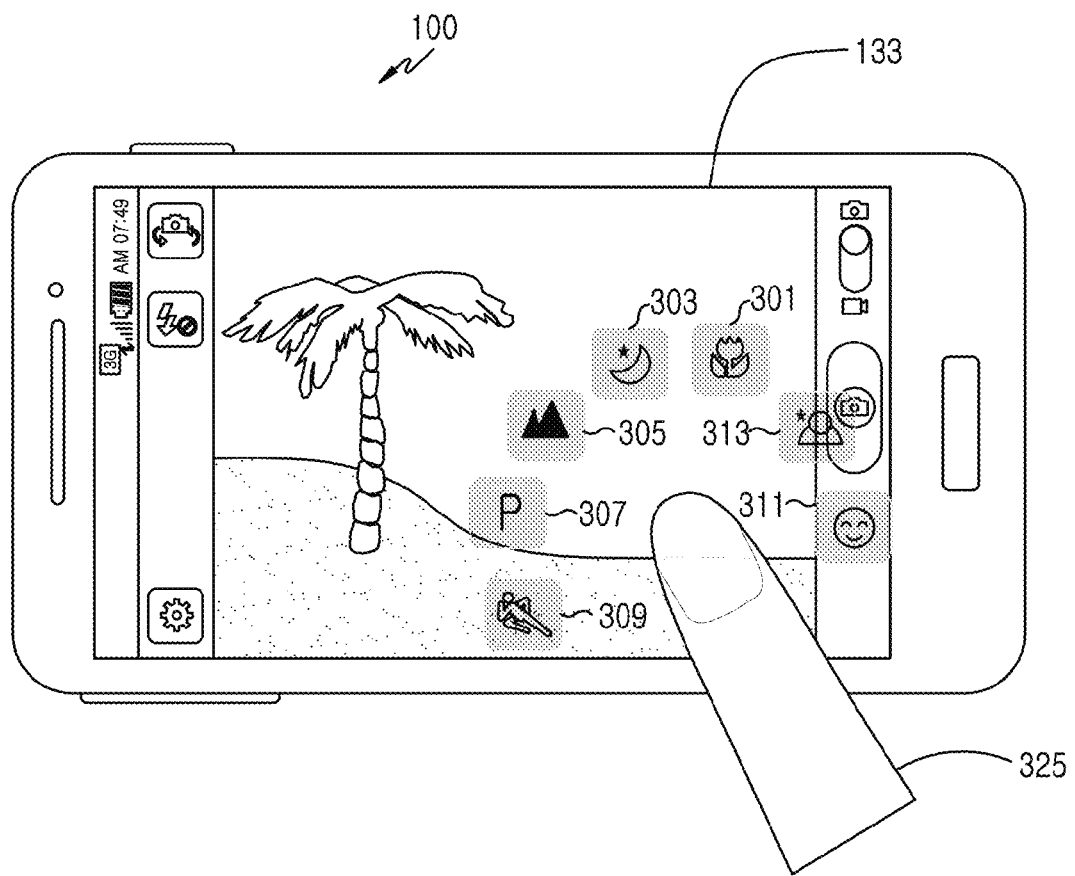

FIG. 4B illustrates another example UI displayed on a touch screen in an electronic device. The electronic device 100 may display a preview on the touch screen 133 via the camera unit 150, and may display a menu for setting a shooting and scene mode on the touch screen 133 in accordance with information determined in the smart image program 114 in response to a predefined input.

Referring to FIG. 4B, a method different from the method of displaying the menu for setting the shooting and scene mode of FIG. 3B and FIG. 4A may be used. The electronic device 100 may detect a maintained touch of any area of a touch screen as the predefined input for displaying the shooting and scene mode menu. By performing the predefined input, the electronic device 100 may configure a UI operation such that shooting and scene mode icons are located around a touch point of the touch screen 133. If the icons cannot be located around the touch point of the touch screen 133 as illustrated in FIG. 4A, the smart image program 114 may provide a menu to reconfigure locations of the icons and display the icons on the touch screen 133 as illustrated in FIG. 4A.

Although various methods of displaying the menu for setting the shooting and scene mode on the touch screen are described on the basis of the examples of FIG. 3B, FIG. 3C, FIG. 4A, FIG. 4B, etc., the present disclosure is not limited to the aforementioned examples. Although the menu for setting the shooting and scene mode is described by using an icon, it may be displayed in other ways, such as in a list form or the like. In addition, when configuring a UI operation of the menu for setting the shooting and scene mode, a size, location, arrangement, transparency, etc., of the displayed mode may be reconfigured.

Figure 5A:
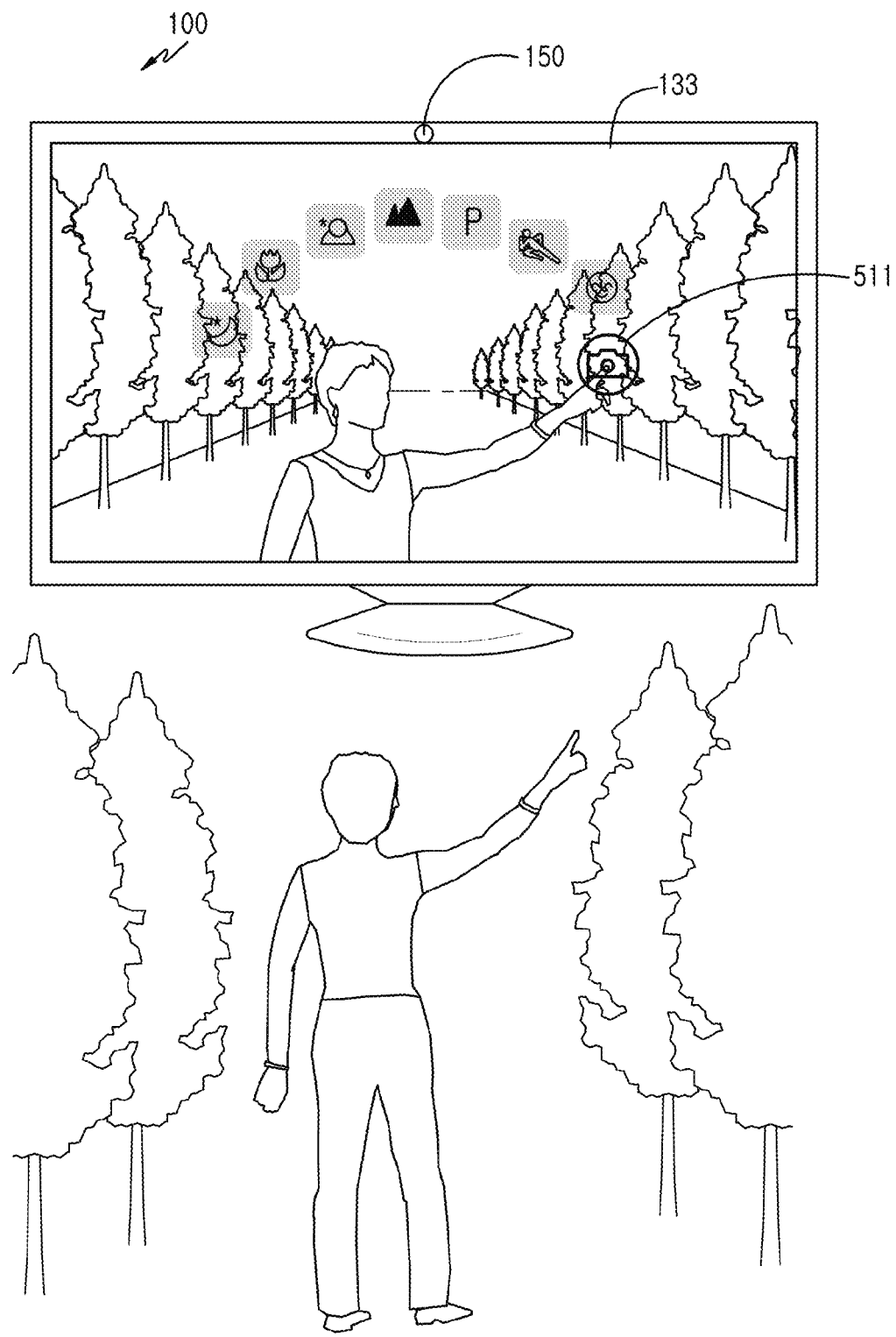
FIG. 5A and FIG. 5B illustrate an example UI for controlling an electronic device and displayed on a touch screen in accordance with aspects of the present disclosure.

FIG. 5A illustrates another example UI for controlling an electronic device and a display on a touch screen. Referring to FIG. 5A, the electronic device 100 may display a menu for setting a shooting and scene mode on a preview screen of the touch screen 133. For example, the electronic device 100 may configure and display a UI operation (e.g., a photographing button icon) to the display unit 131 for displaying the preview of the camera service. The menu for setting the shooting and scene mode may be displayed by allowing the camera unit 150 to perform motion capturing on a UI displayed on the display unit 131, when a predefined input is detected. The predefined input may be detected when a photographing button icon is touched or pressed by using a preview screen on which preparatory photographing is currently performed, or by allowing the motion detection sensor to detect the predefined input from a motion of the object. In addition, the photographing button icon may be a virtual device which does not exist in practice and which is displayed by configuring a UI operation in the preview screen of the electronic device 100.

Figure 5B:
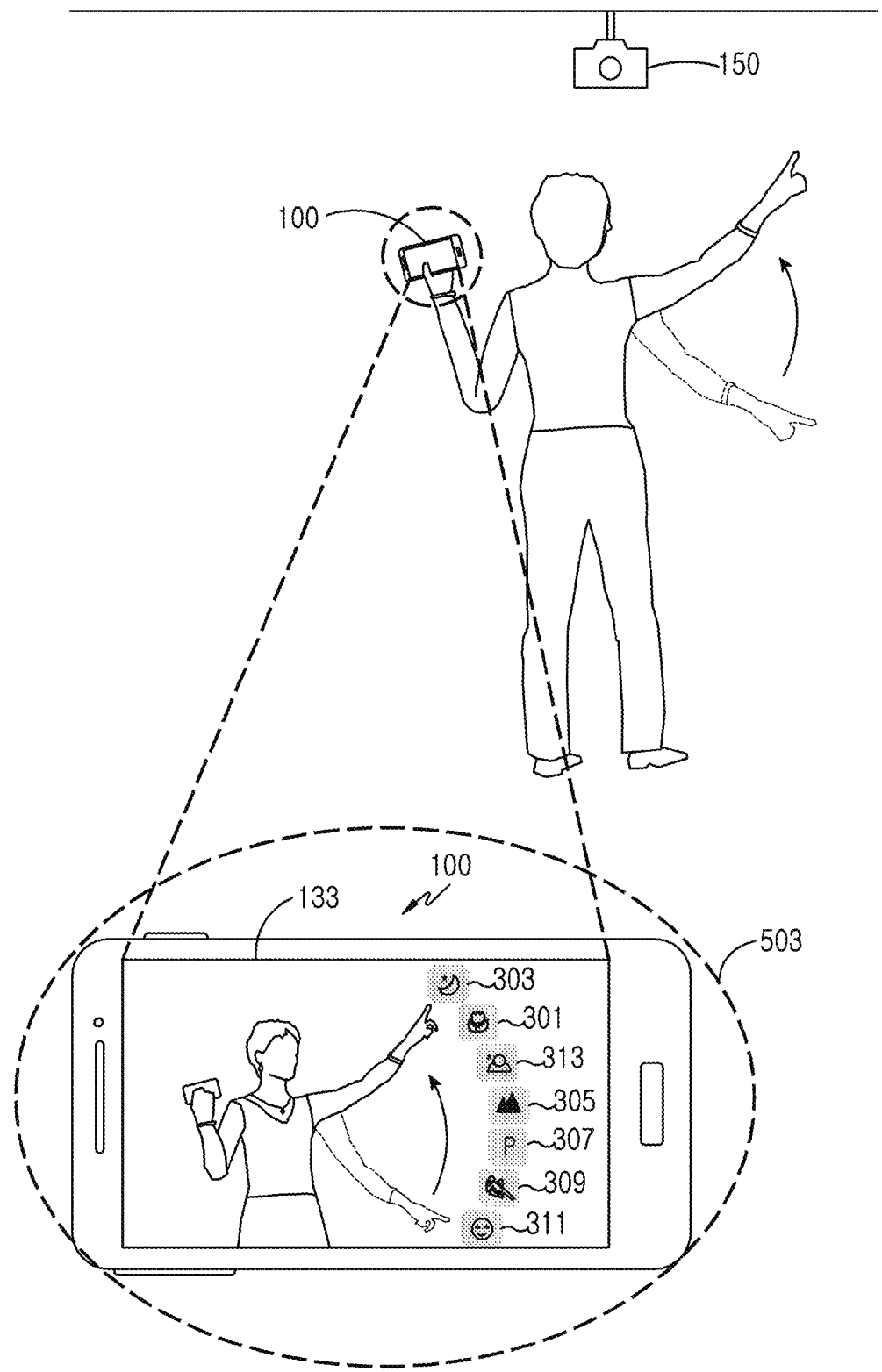

FIG. 5B illustrates an example UI for controlling an electronic device and displayed on a touch screen. Referring to FIG. 5B, the electronic device 100 may be connected to the camera unit 150 or a motion detection unit (not shown) by using wired or wireless communication. Electronic device 100 may display a menu for setting a shooting and scene mode to a preview screen of the touch screen 133. In this example, the wireless communication method may transmit and receive data in accordance with a predetermined instruction or program by using near field communication such as infrared, wireless communication, Bluetooth, BLE, WiFi, etc. In addition, the camera unit 150 or the motion detection unit (not shown) may be configured in a detachable module type or may be included in a second electronic device.

The electronic device 100 may receive a preview image from the camera unit 150, may configure a UI operation, and may display it on the touch screen 133. The menu for setting the shooting and scene mode may be displayed by allowing the camera unit 150 to perform motion capturing on a UI displayed on the display unit 131, when a predefined input is detected. The predefined input may include an arm moved in a specific direction within a preview range that triggers preparatory photographing on the object or within an operation range of the motion detection unit (not shown). In another example, the predefined input may comprise allowing the motion detection sensor to detect the predefined input from a motion of the object.

Figure 6:
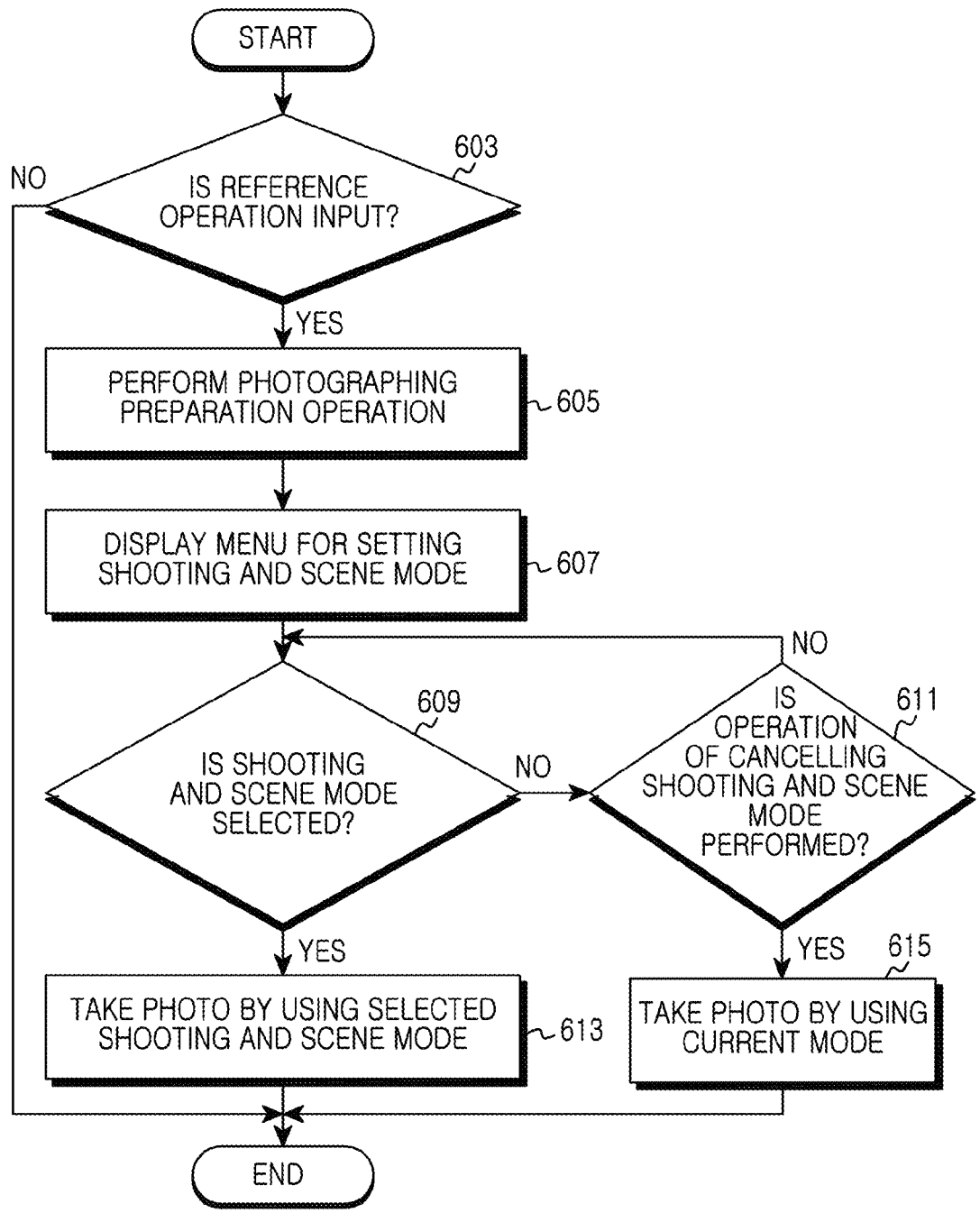
FIG. 6 is a flowchart illustrating an example method for controlling an electronic device in accordance with aspects of the present disclosure.

FIG. 6 is a flowchart illustrating an example method of controlling an electronic device in accordance with aspects of the present disclosure. Referring to FIG. 6, when a predefined input is detected in a photographing standby state of a camera service, a series of operations can be performed.

The series of operations may include an operation of displaying a menu for setting a shooting and scene mode on the touch screen 133 and an operation of photographing an object in the selected mode.

In operation 603, a photographing standby state may be displayed on the touch screen 133 upon execution of the camera service. When a gesture is detected, smart image program 114 may identify whether the gesture is a predefined input.

In one example, the predefined input may act as an instruction for displaying the menu for setting the shooting and scene mode on the touch screen 133 using smart image program 114. The predefined input may be identified by using one or more methods among various gestures that can be performed by using the electronic device 100. In one example of the predefined input, when using the camera service, it may be determined that a touch is held for longer than a predetermined time instead of being released. It is understood however that predefined input detection is not limited to the aforementioned example, and that various methods may also be used. In addition, one of the predefined inputs described in FIG. 3A may be determined, or another method may be defined and used.

If an input gesture performs the predefined input, the electronic device 100 may perform an operation 605. Otherwise, if the predefined input is not performed, the procedure of FIG. 6 may end. In the operation 605, if the predefined input is determined in a photographing standby state of the electronic device 100, a photograph preparation may be performed. In one example of photograph preparation, the electronic device 100 may focus around a selected position by using the camera unit 150.

Referring to the operation 605, the photograph preparation may be performed simultaneously or after the predefined input, and may be performed in another operation (before the predefined input, simultaneously or after the operation of displaying the menu for setting the shooting and scene mode) as described with reference to FIG. 3A. After detecting the predefined input (e.g., the operation 603), the photograph preparation and operation 607 may also be performed simultaneously.

In operation 607, the menu for setting the shooting and scene mode may be displayed on the touch screen 133, which may display a preview acquired by using the camera unit 150. For example, the menu for setting the shooting and scene mode may be displayed with respect to a location of the detected predefined input on touch screen 133. Referring to FIG. 3B, FIG. 4A, or FIG. 4B, the electronic device 100 may display it on the touch screen 133 so that shooting and scene mode icons are located in a direction capable of displaying the menu for setting the shooting and scene mode in accordance with an input gesture (e.g., the predefined inputs 315, 317, 319, 323, or 325), for example, in a shape of a circle, a semi-circle, a semi-ellipse, a fan, etc.

In another example, a sub-menu of the selected shooting and scene mode may be displayed in accordance with the shooting and scene mode selected by using the touch screen 133. Referring to FIG. 3C, the electronic device 100 may display menu icons for displaying adjustable variables controlled by the selected shooting and scene mode on the touch screen 133.

In operation 609, the electronic device 100 may identify whether a shooting and scene mode was selected from the menu displayed on touch screen 133. In one example, a drag intended to select the landscape mode 305 may be detected by the smart image program 114 on touch screen 133, as shown in FIG. 3B (see predefined input 317). In this instance, a typical drag method, such as a touch, drag, and release may be detected on the touch screen 133 and considered to be the predefined input 315 shown in FIG. 3A. In response to holding the touch, the menus 301 to 313 for setting the shooting and scene mode of FIG. 3B may be displayed. The landscape mode 305 may be selected by dragging the corresponding icon and releasing the touch.

In addition, if a magnification of a zoom function can be controlled by using a sub-menu of the landscape mode 305 and a 3× zoom is selected, menus 331 to 337 may be displayed. Menus 331 to 337 may allow a user to select the magnification of a zoom function by using the sub-menu of the landscape mode 305, when the landscape mode 305 is selected and the touch is held. The menus may allow a user to select the 3× zoom mode 333 by dragging a corresponding icon and releasing the touch.

In the above examples, the mode selection method is not limited only to a touch-and-drag. Thus, the shooting and scene mode may be displayed on the touch screen 133, and one or more of methods (e.g., one touch (click) or multi-touch (e.g., double click), flick, hovering, etc.) may be employed. In one example, hovering may comprise an input on the touch input unit 132 located within a predetermined distance from the touch screen 133. The hovering may be carried out using an object such as a touch pen or the like for inputting a gesture through a touch. In addition to the term 'hovering', a true touch, a floating touch, a spatial touch, etc., may also be used.

If it is determined in an operation 609 that the shooting and scene mode is selected, an operation 613 may be performed. Otherwise, an operation 611 may be performed. In the operation 611, the electronic device 100 may control the camera unit 150 in accordance with the selected mode and may photograph an object. For example, in the menu for setting the shooting and scene mode of the operation 609, if the 3× zoom 333 is selected from a sub-menu of 'magnification', the electronic device 100 may control the camera unit 150 in accordance with information pre-programmed in the landscape mode 305 and may control a magnification of a zoom function of the camera unit 150 to 3× and may photograph an object. In another example, if the smile mode 311 is selected from the menu for setting the shooting and scene mode at operation 609, the electronic device 100 may control the camera unit 150 in accordance with information pre-programmed in the smile mode 311 and may photograph the object upon sensing a smiling face from the camera unit 150.

When the electronic device 100 photographs the object in accordance with the selected mode, the procedure of FIG. 6 may end. In operation 611, it may be determined whether to cancel or end the mode selection operation. For example, referring back to FIG. 4A, a specific portion of a preview of the touch screen 133 is touched to perform photograph preparation, such as bringing the camera unit 150 into focus. When the menu for setting the shooting and scene mode is displayed on the touch screen 133 in response to a predefined input, an operation of cancelling the setting of the shooting and scene mode may be performed. Upon sensing the operation of cancelling the setting, the electronic device 100 may release the display of the menu for setting the shooting and scene mode and may proceed to the operation 615, or the procedure may end without having to perform an operation 615.

In the operation 615, the object may be photographed in accordance with the existing mode without having to change the shooting and scene mode. For example, when the setting of the shooting and scene mode is cancelled from the smart image program 114, an instruction may be programmed to photograph the object in accordance with the existing shooting and scene mode. In the operation 611, when performing an operation of cancelling the setting of the shooting and scene mode, the electronic device 100 may control the camera unit in accordance with information programmed in the existing shooting and scene mode, or may photograph the object without the control. When the electronic device 100 photographs the object in accordance with the existing mode, the procedure of FIG. 6 may end.

Figure 7:
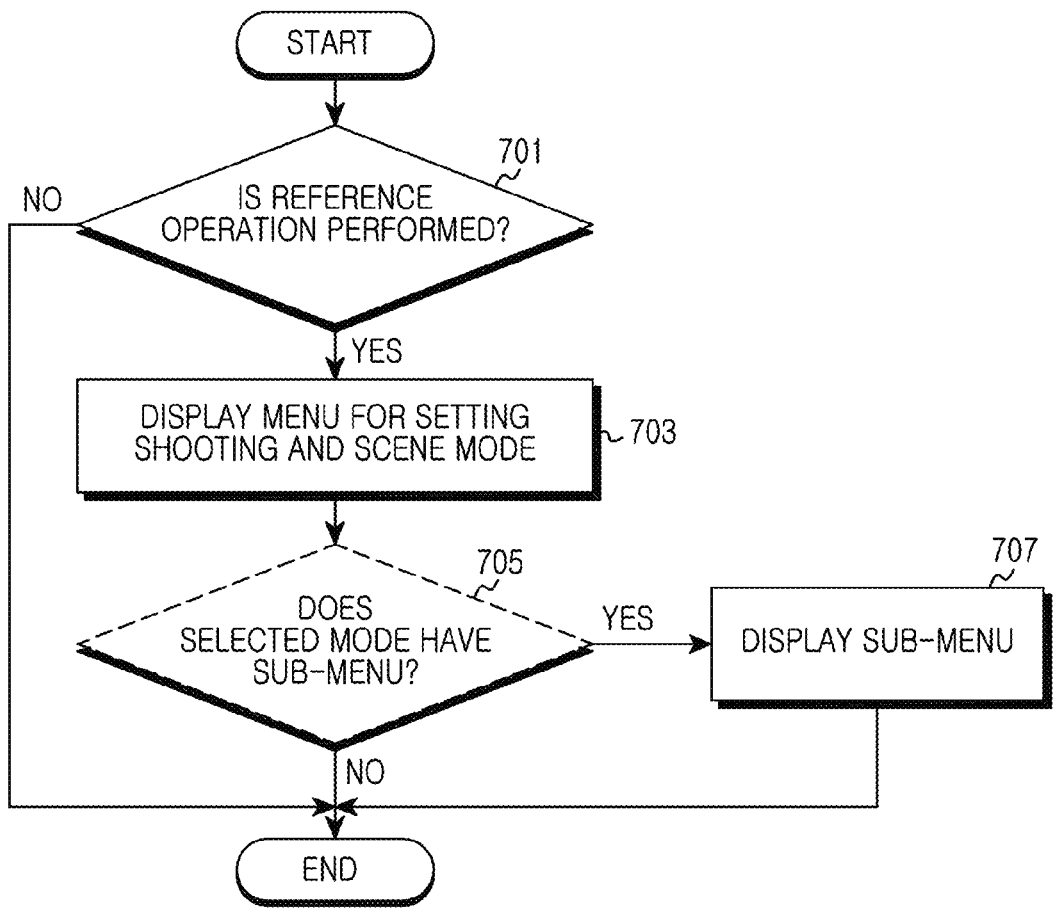
FIG. 7 is a flowchart illustrating an example method for displaying a program in an electronic device in accordance with aspects of the present disclosure.

FIG. 7 is a flowchart illustrating another example method in accordance with aspects of the present disclosure. Referring to FIG. 7, a predefined input is performed to display menu for setting a shooting and scene mode on a second display (not shown) or the touch screen 133. At operation 701, it is identified whether an input gesture is a predefined input for displaying the menu for setting the shooting and scene mode programmed in the smart image program 114. In one example, one or more of predefined inputs of operation 604 of FIG. 3A may be deemed the predefined input, or another method may be used. In another example, the predefined input may be detected using a signal of a magnetic field of an object hovering within a predetermined distance from the touch screen 133 without having to perform a direct touch.

In another example, the predefined input may be detected with a voice instruction (or a voice input) via microphone 142; a standby time more than a specific time; a facial or biometric recognition; a brainwave recognition; or a control from a second electronic device. For example, if the predefined input of the smart image program 114 is as hovering gesture, the menu for setting the shooting and scene mode may be displayed.

In another example of determining the predefined input, a preview may be displayed an input on touch input unit 132 may be determined as the predefined input. This may be accomplished by interworking a reference region of the displayed preview and a pre-set gesture acquired by using the camera unit 150 or a motion detection unit (not shown). For example, referring to FIG. 5A, if the predefined input is determined by interworking a button icon 511 with a gesture for using the camera unit 150 or a motion detection unit (not shown), the gesture acquired by using the camera unit 150 or the motion detection unit (not shown) may trigger display of the menu for setting the shooting and scene mode. The gesture may include touching or pressing the button icon 511 displayed in a reference area on a preview displayed on the touch screen 133 or a second display unit.

In operation 703, the menu for setting the shooting and scene mode may be used to configure a UI operation in accordance with information predetermined in the smart image program 114 and may be displayed on the touch screen 133. The touch screen 133 may display a preview acquired by using the camera unit 150. The menus 301 to 313 for setting the shooting and scene mode configured in the touch screen 133 of FIGS. 3A, 3B, and 3C or one or more displays of the examples described in operation 607 may be determined.

In another example of the display method, if the camera unit 150 is connected externally to the electronic device 100 through wireless communication such as a wireless or Bluetooth, BLE, WiFi Direct, etc., the electronic device 100 may receive a preview in accordance with a predetermined instruction from the camera unit 150. Furthermore, the electronic device may display a menu for setting the shooting and scene mode in accordance with information predetermined in the smart image program 114, and may display it on the touch screen 133 of the electronic device 100. In this example, the camera unit 150 may be a component of a second electronic device (not shown).

In another example of the display method, if the touch screen 133 or the second display unit (not shown) is connected externally to the electronic device 100 through wireless communication such as a wireless or Bluetooth, BLE, WiFi Direct, etc., the electronic device 100 may configure a preview in accordance with a predetermined instruction and display a menu for setting the shooting and scene mode in accordance with information predetermined in the smart image program 114. In this example, the touch screen 133 or the second display unit (not shown) may be a component of a second electronic device (not shown).

In the aforementioned examples, the camera unit 150, the touch screen, or the second display unit may be configured with different devices as illustrated in the example of FIG. 5B. The touch screen 133 of FIG. 5B may be configured with a second display unit not including the touch input unit 132.

In operation 705, it may be determined whether an adjustable setting value is included among the variables controlled by the selected shooting and scene mode. If the variables of the selected shooting and scene mode include the adjustable setting value, an operation 707 may be performed; otherwise, the procedure of FIG. 7 may end.

In the operation 707, if it is determined that the adjustable setting value is included among the variables controlled by the selected shooting and scene mode, a menu that allows adjusting the value may be displayed on a specific area of the touch screen 133. For example, referring to FIG. 3B and FIG. 3C, the landscape mode 305 may be selected in FIG. 3B, and the landscape mode may include a setting value menu capable of selecting a magnification of a zoom function of the camera unit 150. In this instance, a UI may be displayed on the touch screen 133 that allows magnification of a zoom function in the landscape mode in accordance with the method determined in the smart image program 114. When the electronic device performs the operation 707, the procedure of FIG. 7 may end.

As described above, if an electronic device photographs an object, a predetermined operation may be performed to display a menu for setting a shooting and scene mode and to select a mode without having to perform an operation of setting the shooting and scene mode to set the shooting and scene mode. Therefore, a time required to set the shooting and scene mode can be decreased and the object can be photographed in a desired mode.

In accordance with an aspect of the present disclosure, a method in an electronic device, the method comprising: displaying a screen for selecting one or more shooting modes in accordance with a photographing instruction in a preview screen;

selecting the one or more shooting modes among a plurality of shooting modes displayed in the screen; and photographing in accordance with the selected one or more shooting mode. Wherein the photographing instruction includes a shutter manipulation, an auto-focus control instruction, or an object confirmation instruction. Wherein the shooting mode includes a shutter speed setting value, an aperture setting value, an International Standards Organization (ISO) sensitivity setting value, or a focal distance setting value of a camera module. Wherein the setting value is either fixed or adjustable. Wherein the instruction or the selection is performed by using one or more of a hovering input, a touch input, a double-touch input, a triple-touch input, a touch-and-hold input, a touch-and-drag-and-release input, an input based on a facial or biometric recognition, an input based on a brainwave recognition, a voice input, and an input in a second electronic device. Wherein the screen from which the shooting mode selection is detected changes one or more of a position, size, transparency, brightness, and color displayed on the preview screen based at least partially on the photographing instruction or the preview screen. Wherein the plurality of shooting modes are displayed in the screen by changing a position, a size, a transparency, a brightness, a color, or an arrangement. Wherein the preview screen or the screen from which the shooting mode selection is detected is displayed by a second electronic device connected to the electronic device in a wired or wireless communication fashion.

In accordance with an aspect of the present disclosure, a method of operating an electronic device, the method comprising: displaying a screen from which a shooting mode selection is detected on a preview screen of the electronic device; detecting one or more shooting modes selected from among a plurality of shooting modes displayed in the screen; and instructing a camera unit or a second electronic device including the camera unit to photograph in accordance with the selected one or more shooting modes. Wherein the electronic device, the camera unit, and the second electronic device are communicate using wired communication or wireless communication. Wherein the wireless communication is connected using mobile communication, infrared wireless communication, Bluetooth, WiFi, or Bluetooth Low Energy (BLE). Wherein the plurality of shooting modes include a shutter speed setting value, an aperture setting value, an ISO sensitivity setting value, or a focal distance setting value of a camera module. Wherein the camera unit and the second electronic device adjusts a setting value in accordance with adjustments detected by the electronic device. Wherein the instruction or the selection comprises detecting an input within a predetermined range of a motion detection unit and the camera unit, the motion detection unit detecting an operation of an object in a sensing range and the camera unit detecting a gesture of the object displayed on the preview screen by using a motion capture.

In accordance with an aspect of the present disclosure, an electronic device comprising: a display; and a processor operatively coupled to the display, the processor to: display a screen configured to select one or more shooting modes according to a photographing instruction; select the one or more shooting modes among a plurality of shooting modes displayed in the screen; and photograph in accordance with the selected one or more shooting modes. Wherein the processor to further perform automatically the photographing in accordance with the selected shooting mode. Wherein the processor to further: adjust a shutter speed setting value, an aperture setting value, an ISO sensitivity setting value, and a focal distance setting value of a camera module; and display the values on a touch screen based at least partially on the adjustments by using the plurality of shooting modes. Wherein the processor to further detect an input based on a gesture, an input based on a motion, an input based on a facial or biometric recognition, an input based on a brainwave recognition, a voice input, or an input from a second electronic device. Wherein the processor to further reconfigure one or more values among a position, size, shape, arrangement, and transparency of the plurality of shooting modes displayed on a preview screen, and to display the values on the preview screen of a touch screen. Wherein the processor to further display the preview screen or the plurality of shooting modes on a second electronic device connected to the electronic device using wired communication or wireless communication.

In accordance with an aspect of the present disclosure, an electronic device comprising: a display; and a processor operatively coupled to the display, wherein the processor controls operations of: displaying a screen configured to select one or more shooting modes according to a photographing instruction; selecting the one or more shooting modes among a plurality of shooting modes displayed in the screen; and performing photographing according to the selected one or more shooting modes.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101. The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

What is claimed is:

1. An apparatus comprising:
a touch screen;
a camera; and
a processor adapted to:
present an image via the touch screen;
identify a first input received with respect to the image presented via the touch screen;
present a first shooting menu and a second shooting menu via the touch screen based at least in part on the identifying;
identify a second input moved from the image presented via the touch screen, the second input to select a shooting menu from the first and second shooting menus; and
perform, using the camera, a photographing function corresponding to the selected shooting menu in response to the second input being released from the selected shooting menu.

2. The apparatus of claim 1, further comprising a sensor operatively coupled with the touch screen and adapted to detect a pressure applied with respect to at last one portion of the touch screen.

3. The apparatus of claim 1, wherein the apparatus is adapted to:
present an icon corresponding to the photographing function as at least part of the image.

4. The apparatus of claim 1, wherein the processor is adapted to:
present, in response to the first input, the first shooting menu and the second shooting menu as translucent.

5. The apparatus of claim 1, wherein the processor is adapted to:
identify, as at least part of the first input, a touch input received via the touch screen.

6. The apparatus of claim 1, wherein the processor is adapted to:
identify, as at least part of the first input, a motion input received via a motion sensor or another camera operatively coupled with the apparatus.

7. The apparatus of claim 1, wherein the processor is adapted to:
identify, as at least part of the second input, a drag input or a flick input received via the touch screen.

8. The apparatus of claim 1, wherein the processor is adapted to:
present the first shooting menu and the second shooting menu in a form of a list.

9. The apparatus of claim 1, wherein the processor is adapted to:
perform a specified function based at least in part on a determination that the first input satisfies a first specified condition.

10. The apparatus of claim 9, wherein the processor is adapted to:
perform the presenting of the first and second shooting menus based at least in part on a determination that the first input satisfies a second specified condition.

11. An apparatus comprising:
a touch screen;
a camera; and
a processor adapted to:
present an image via the touch screen;
identify a first input received with respect to the image presented via the touch screen;
present a first shooting menu and a second shooting menu via the touch screen based at least in part on the identifying;
identify a second input moved with respect to the first shooting menu or the second shooting menu, the second input to select a shooting menu from the first and second shooting menus; and
perform, using the camera, a photographing function corresponding to the selected shooting menu in response to the second input being released from the selected shooting menu.

12. The apparatus of claim 11, further comprising a sense operatively coupled with the touch screen and adapted to detect a pressure applied with respect to at last one portion of the touch screen.

13. The apparatus of claim 11, wherein the processor is adapted to:
identify, as at least part of the first input, an input received based at least in part on a biometric recognition.

14. The apparatus of claim 11, wherein the processor is adapted to:
present the first and second shooting menus in a shape of a circle, a semi-circle, a semi-ellipse, a fan, or any combination of a circle, a semi-circle, a semi-ellipse, and a fan.

15. An apparatus comprising:
a touch screen; and
a processor adapted to:
present content via the touch screen;
identify a first input received with respect to at least one portion of the content presented via the touch screen;
based at least in part on a first determination that the first input satisfies a first specified condition,
perform a specified function; and
based at least in part on a second determination that the first input satisfies a second specified condition, present a first menu and a second menu via the touch screen, the first menu corresponding to a first sub-function related to the specified function, and the second menu corresponding to a second sub-function related to the specified function, identify a second input moved from the at least one portion of the content, the second input to select a menu from the first and second menus, and perform a corresponding sub-function of the first sub-function and the second sub-function corresponding to the selected menu in response to the second input being released from the selected menu.

16. The apparatus of claim 15, further comprising a sensor operatively coupled with the touch screen and adapted to detect a pressure applied with respect to at last one portion of the touch screen.

17. The apparatus of claim 15, wherein the processor is adapted to:
present the first menu and the second menu as translucent in another portion of the content based at least in part on the second determination.

18. The apparatus of claim 15, wherein the processor is adapted to:
change, as at least part of the presenting of the first menu and the second menu, a color of an area corresponding to the selected menu based at least in part on the second input.

19. The apparatus of claim 15, wherein the processor is adapted to:

present, via the touch screen, another content corresponding to the corresponding sub-function; and
present an indication representing the corresponding sub-function in at least one portion of the other content.

20. The apparatus of claim 15, wherein the processor is adapted to:
perform the specified function based on a determination, as at least part of the first specified condition, that the first input has been maintained for a first specified period of time; and
present the first menu and the second menu based on a determination, as at least part of the second specified condition, that the first input has been maintained for a second specified period of time.

\* \* \* \* \*